US006539627B2

(12) United States Patent
Fleck

(10) Patent No.: US 6,539,627 B2
(45) Date of Patent: Apr. 1, 2003

(54) METHOD OF MAKING TURBULATED COOLING HOLES

(75) Inventor: James N. Fleck, Boxford, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/072,207

(22) Filed: Feb. 7, 2002

(65) Prior Publication Data

US 2002/0094272 A1 Jul. 18, 2002

Related U.S. Application Data

(62) Division of application No. 09/487,070, filed on Jan. 19, 2000, now abandoned.

(51) Int. Cl.[7] ..... B23P 15/00

(52) U.S. Cl. ..... 29/889.72; 29/889.722; 29/889.7

(58) Field of Search ..... 29/889.7, 889.721, 29/889.722, 889.72, 557; 72/370.04, 398; 416/97 R, 96 R, 115, 96 A

(56) References Cited

U.S. PATENT DOCUMENTS

| | | | | |
|---|---|---|---|---|
| 3,329,596 A | | 7/1967 | Abt et al. | |
| 3,738,771 A | | 6/1973 | Delarbre et al. | |
| 4,159,407 A | | 6/1979 | Wilkinson et al. | |
| 4,423,616 A | * | 1/1984 | Pease | 72/348 |
| 4,428,220 A | * | 1/1984 | Rammesten | 72/370.05 |
| 4,852,380 A | * | 8/1989 | Haldric et al. | 72/402 |
| 4,936,503 A | * | 6/1990 | Hinds et al. | 228/173.4 |
| 4,992,025 A | | 2/1991 | Stroud et al. | |
| 4,995,949 A | | 2/1991 | Rhoades | |
| 5,062,768 A | * | 11/1991 | Marriage | 416/97 R |
| 5,096,379 A | * | 3/1992 | Stroud et al. | 416/97 R |
| 5,306,401 A | | 4/1994 | Fierkens et al. | |
| 5,413,463 A | | 5/1995 | Chiu et al. | |
| 5,419,039 A | * | 5/1995 | Auxier et al. | 29/889.721 |
| 5,448,829 A | * | 9/1995 | Dillner et al. | 29/889.722 |
| 5,511,309 A | * | 4/1996 | Beabout | 29/889.72 |
| 5,941,686 A | | 8/1999 | Gupta et al. | |
| 5,980,209 A | | 11/1999 | Barry et al. | |
| 6,193,465 B1 | * | 2/2001 | Liotta et al. | 416/96 A |
| 6,214,248 B1 | * | 4/2001 | Browning et al. | 216/56 |
| 6,254,347 B1 | * | 6/2001 | Zhang et al. | 424/449 |
| 6,254,333 B1 | * | 7/2001 | Merry | 415/115 |
| 6,339,879 B1 | * | 1/2002 | Wheat et al. | 29/889.721 |

FOREIGN PATENT DOCUMENTS

| | | |
|---|---|---|
| EP | 207799 A | 1/1987 |
| JP | 3-182602 A | 8/1991 |

* cited by examiner

*Primary Examiner*—I Cuda Rosenbaum
(74) *Attorney, Agent, or Firm*—V G Ramaswamy; Sonnenschein Nath & Rosenthal

(57) ABSTRACT

A component for use in a flow path of a gas turbine engine. The component includes a body having an exterior surface mountable in the gas turbine engine so the exterior surface is exposed to gases flowing through the flow path of the engine. The body has a cooling hole extending through the body to the exterior surface for transporting cooling air from a cooling air source outside the flow path of the engine to the exterior surface of the body for providing a layer of cooling air adjacent the exterior surface of the body to cool the surface and create a thermal barrier between the exterior surface and the gases flowing through the flow path of the gas turbine engine. The cooling hole is defined by an elongate annular surface extending through the body of the component and terminating at the exterior surface of the body. The hole has a length, a maximum width less than about 0.010 inches, and a cross-sectional shape which varies along the length in a predetermined manner for affecting characteristics of cooling air transported through the hole.

7 Claims, 3 Drawing Sheets

METHOD OF MAKING TURBULATED COOLING HOLES

This application is a divisional application of U.S. patent application Ser. No. 09/487,070, filed Jan. 19, 2000 now Abn.

BACKGROUND OF THE INVENTION

The present invention relates generally to cooling holes in gas turbine engine components, and more particularly to cooling holes adapted for producing turbulent flow, commonly referred to as "turbulated" cooling holes by gas turbine engine designers.

Cooling holes are formed in gas turbine engine components such as vanes, blades and shrouds for transporting film cooling air through the component to cool the component and to form a thermal barrier between the component and hot gases traveling through a main flow path of the engine. As a result of film cooling, the component experiences a cooler temperature than it would otherwise. Accordingly, film cooling permits engine control changes to increase flow path temperatures without adversely affecting the components because the flow path temperatures can be increased until the surface temperatures of the components reach the same level as they would be without film cooling. Alternatively, the flow path temperatures can be kept the same and the component temperatures can be decreased, resulting in increased component life.

Typically, the film cooling air forms a boundary layer which flows along the surface of the component downstream from the hole. This boundary layer physically separates the flow path gases from the component and creates the thermal barrier between the flow path gases and the component. Frequently, the boundary layer has laminar flow characteristics for some distance downstream from the holes. However, laminar flow does not produce as effective a thermal barrier as turbulent flow. Thus, it is desirable to create a boundary layer having turbulent flow. One way to create turbulent flow is to separate the boundary layer from the component by providing a discontinuity along the surface of the component. Prior attempts to create turbulent flow by using cooling holes having diameters less than 0.010 inches have been unsuccessful because the methods could not create repeatable discontinuities inside these small holes.

SUMMARY OF THE INVENTION

Briefly, apparatus of this invention is a component for use in a flow path of a gas turbine engine. The component includes a body having an exterior surface mountable in the gas turbine engine so the exterior surface is exposed to gases flowing through the flow path of the engine. The body has a cooling hole extending through the body to the exterior surface for transporting cooling air from a cooling air source outside the flow path of the engine to the exterior surface of the body for providing a layer of cooling air adjacent the exterior surface of the body to cool the surface and create a thermal barrier between the exterior surface and the gases flowing through the flow path of the gas turbine engine. The cooling hole is defined by an elongate annular surface extending through the body of the component and terminating at the exterior surface of the body. The hole has a length, a maximum width of less than about 0.010 inches, and a cross-sectional shape which varies along the length in a predetermined manner for affecting characteristics of cooling air transported through the hole.

In another aspect, the invention includes a method of forming a turbulated cooling hole in a component for use in a gas turbine engine. The component includes a body having an exterior surface mountable in the gas turbine engine so the exterior surface is exposed to gases flowing through the flow path of the engine. The method comprises the step of forming a hole in the body of the component. The hole is defined by an elongate annular surface extending through the body of the component and terminating at the exterior surface of the body. A mandrel is position in the hole formed in the component. The mandrel has a length and a cross-sectional shape which varies along the length in a predetermined manner. Further, the method includes the steps of permanently deforming the body toward the mandrel to reduce a distance between the elongate annular surface defining the hole and the mandrel and removing the mandrel from the hole of the deformed component thereby to provide a turbulated hole having a cross section which varies along a length of the annular surface defining the hole.

BRIEF DESCRIPTION OF THE DRAWING

Corresponding reference characters indicate corresponding parts throughout the several views of the drawings.

DETAILED DESCRIPTION OF THE PREFERRED EMBODIMENT

Figure 1:
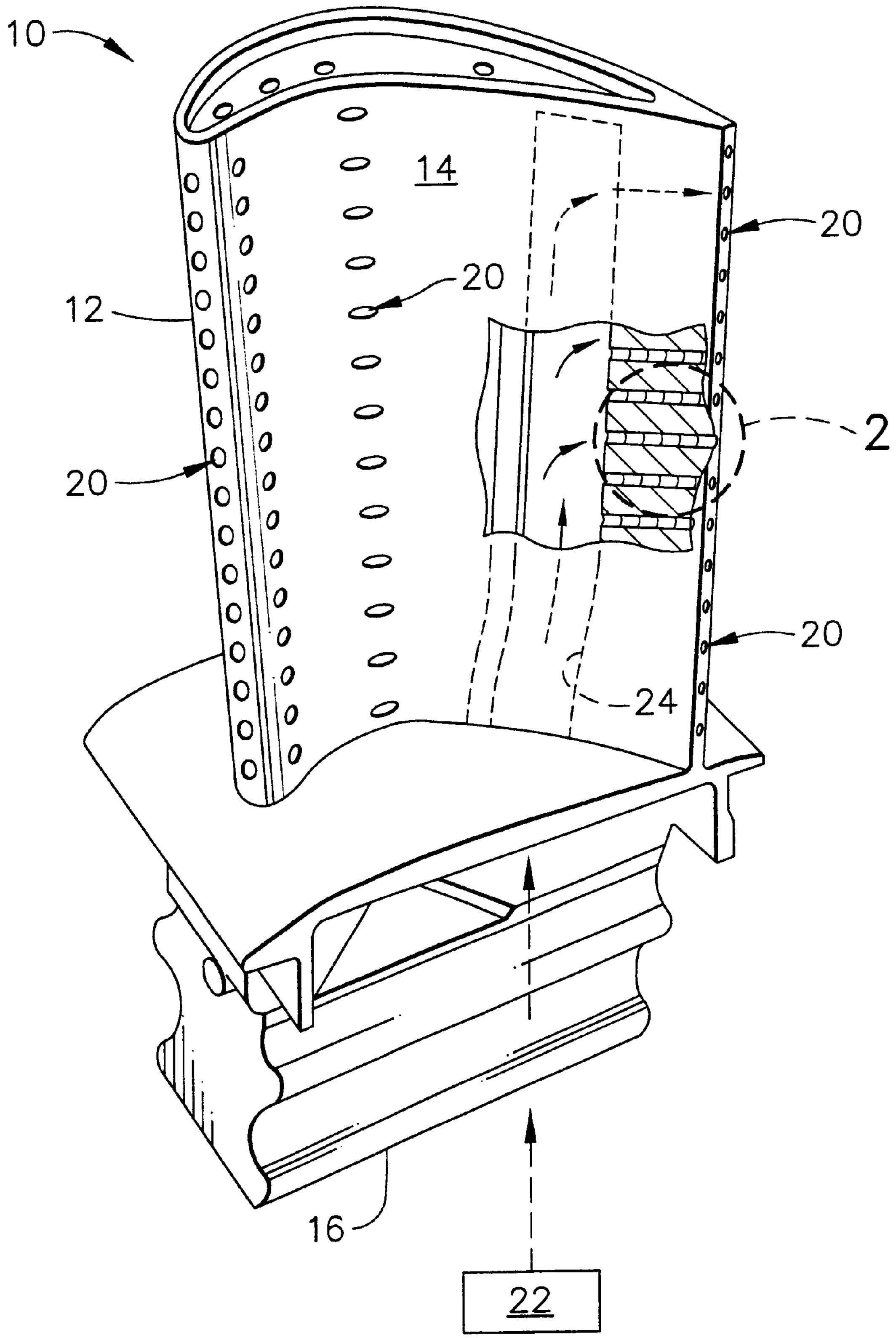
FIG. 1 is a perspective in partial cross section of a gas turbine engine component of the present invention.

Referring now to the drawings and in particular to FIG. 1, a gas turbine engine component is generally designated in its entirety by the reference numeral 10. Although the component 10 shown in FIG. 1 is a high pressure turbine blade, it is envisioned that the component may a blade, vane or shroud without departing from the scope of the present invention. The component 10 includes a body, generally designated by 12, having an exterior surface 14. The body 12 is mountable in a conventional manner in the gas turbine engine (not shown) such as with a dovetail connector 16 so that the exterior surface 14 is exposed to gases flowing through a flow path (not shown) of the engine. A plurality of cooling holes, generally designated by 20, extend through the body 12 to the exterior surface 14. These holes 20 transport cooling air from a cooling air source 22 outside the flow path to the exterior surface 14 of the body 12 for providing a layer of cooling air adjacent the exterior surface of the body. The layer of cooling air cools the surface and creates a thermal barrier between the exterior surface and the gases flowing through the flow path of the gas turbine engine. The cooling air travels from the cooling air source 22 to the cooling holes 20 via internal passages 24 in the component 10.

Figure 2:
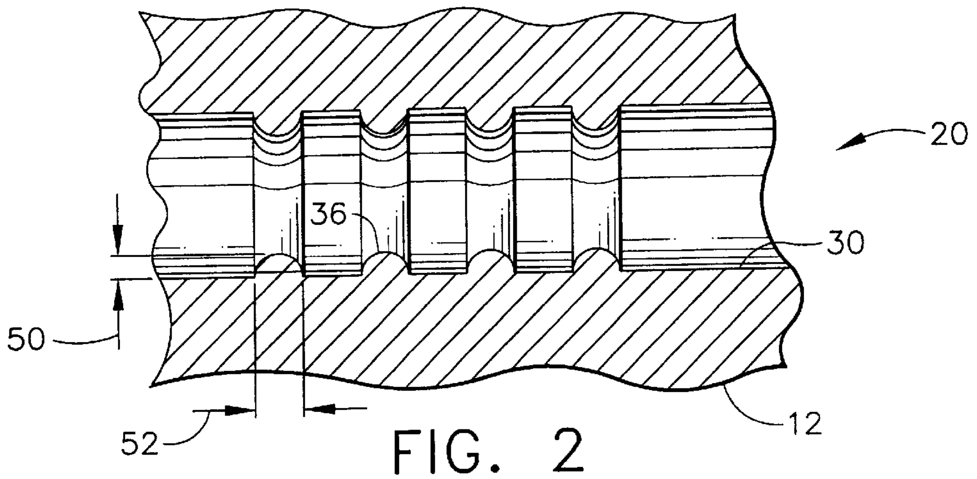
FIG. 2 is a cross section of the component taken in an area identified by the reference character 2 in FIG. 1 showing turbulated cooling holes of a first embodiment.
Figure 3:
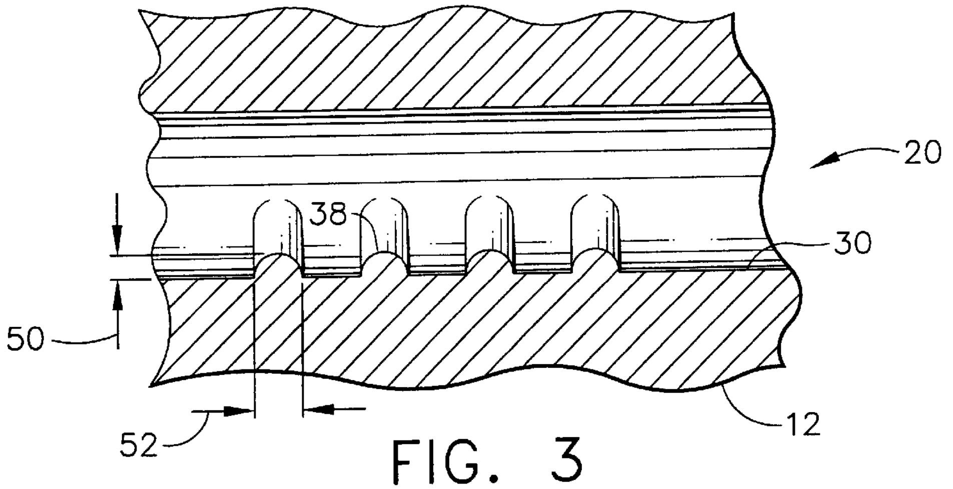
FIG. 3 is a detailed cross section similar to FIG. 2 showing turbulated cooling holes of a second embodiment.
Figure 4:
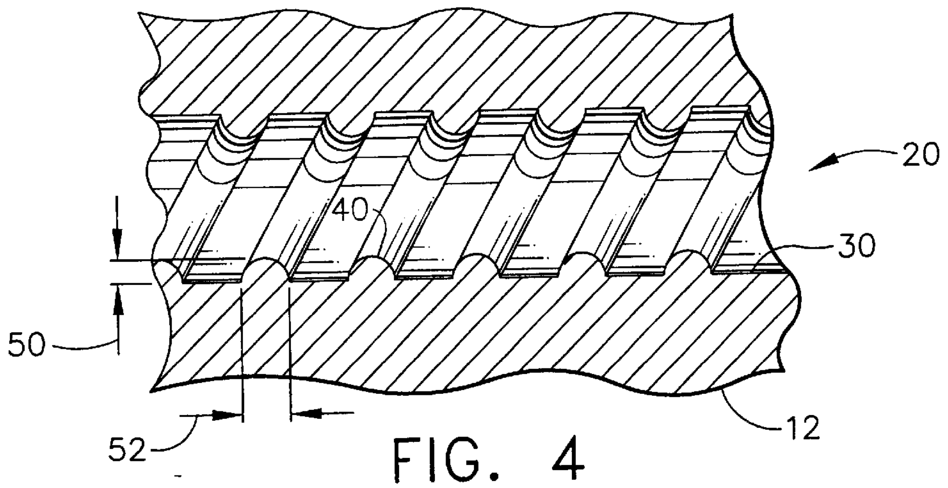
FIG. 4 is a detailed cross section similar to FIG. 2 showing turbulated cooling holes of a third embodiment.
Figure 7:
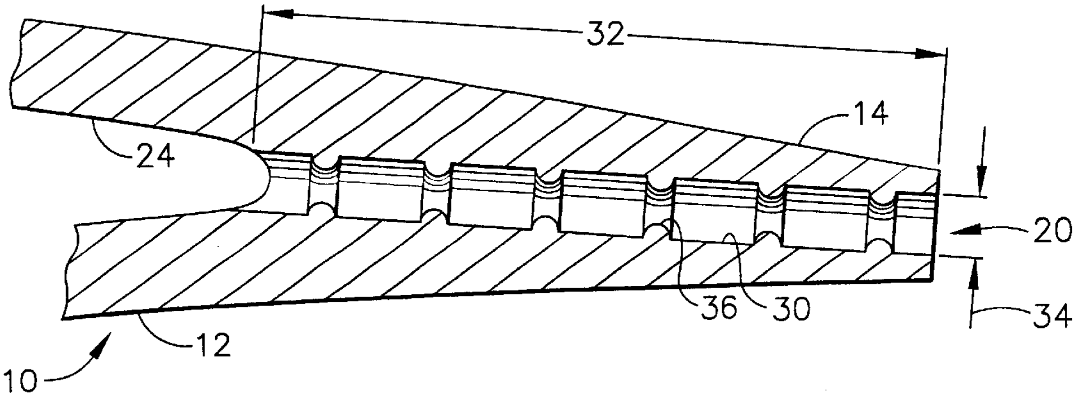
FIG. 7 is a cross section similar to FIG. 6 showing the mandrel removed from the component.

As illustrated in FIG. 2, each cooling hole 20 is defined by an elongate annular surface 30 extending through the body 12 of the component 10 and terminating at the exterior surface 14 (FIG. 1) of the body. As further illustrated in FIG. 7, each hole 20 has a length 32 extending between the internal passage 24 and the exterior surface 14. Each hole 20 also has a maximum width 34 less than about 0.010 inches. Although the hole 20 may have other widths 34 without departing from the scope of the present invention, the hole of one preferred embodiment is cylindrical and has a maximum diameter of about 0.008 inches. In addition, each hole 20 has a cross-sectional shape which varies along the length in a predetermined manner for affecting characteristics of cooling air transported through the hole. For instance, the shape may be generally cylindrical with annular rings 36 spaced at intervals along the hole as shown in FIG. 2. Alternatively, the shape may be generally cylindrical with partial rings 38 extending partially around the cylindrical surface as shown FIG. 3, or in a spiral configuration 40 as shown in FIG. 4. Regardless of the shape, the elongate annular surface 22 includes at least one discontinuous portion (e.g., 36, 38 or 40) protruding into the hole 20 for generating turbulent flow in the cooling air transported through the hole.

As illustrated in FIG. 2, the discontinuous portion (i.e., each annular ring 36) extends a maximum radial distance 50 into the hole 20 from the elongate annular surface 30 defining the hole and a maximum axial distance 52 along the surface defining the hole. In one preferred embodiment, the maximum axial distance 52 is between about four and about five times longer than the maximum radial distance 50. Although the protruding portion may have other maximum radial distances 50 without departing from the scope of the present invention, the maximum radial distance of one preferred embodiment is between about 0.0001 inches and about 0.0005 inches. Further, although the protruding portion may have shapes without departing from the scope of the present invention, the protruding portion of the preferred embodiment has a generally semi-circular cross section as illustrated in FIGS. 2–4. Calculations have estimated a potential 200° F. temperature benefit for a component 10 such as shown in FIG. 1 having turbulated cooling holes 20.

The method of forming the turbulated cooling hole 12 described above is schematically illustrated in FIGS. 5–7. A hole, generally designated by 60, is formed in the body 12 of the component 10. The hole 60 is defined by an elongate annular surface 62 extending through the body 12 of the component 10 and terminating at the exterior surface 14 of the body. Although other methods for forming the hole 60 may be used without departing from the scope of the present invention, in various preferred embodiments the hole is formed using electro-discharge machining, laser machining, or electro-stream machining. Further, although the hole 60 may have other dimensions without departing from the scope of the present invention, the hole of one preferred embodiment has a diameter of between about 0.010 inches and about 0.012 inches.

Figure 5:
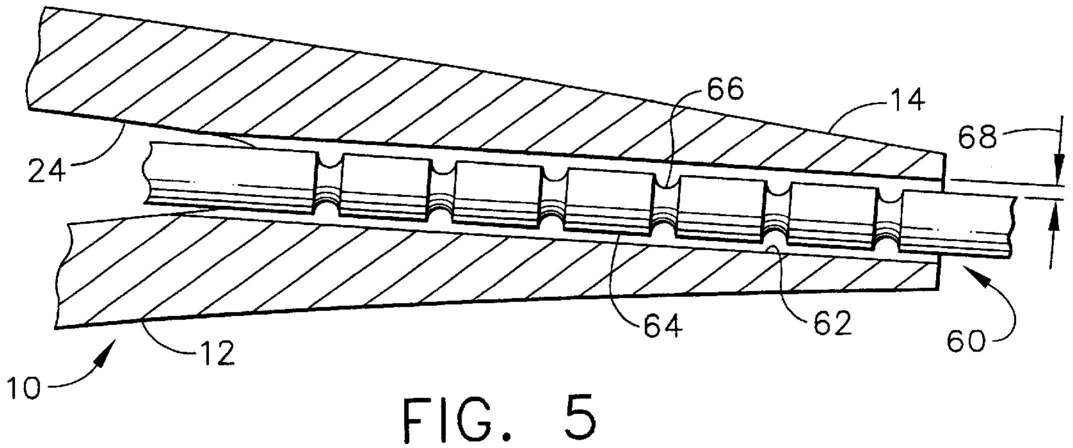
FIG. 5 is a horizontal cross section through the component showing a mandrel inserted in the cooling hole.

As illustrated in FIG. 5, a mandrel 64 is positioned in the hole 60 formed in the component 10. The mandrel 64 has a cross-sectional shape which varies along its length in a predetermined manner to produce the desired cooling hole shape. For instance, if the desired cooling hole 12 has radial protrusions as illustrated in FIG. 2, the mandrel 64 will have rounded grooves 66 as shown in FIG. 5.

Figure 6:
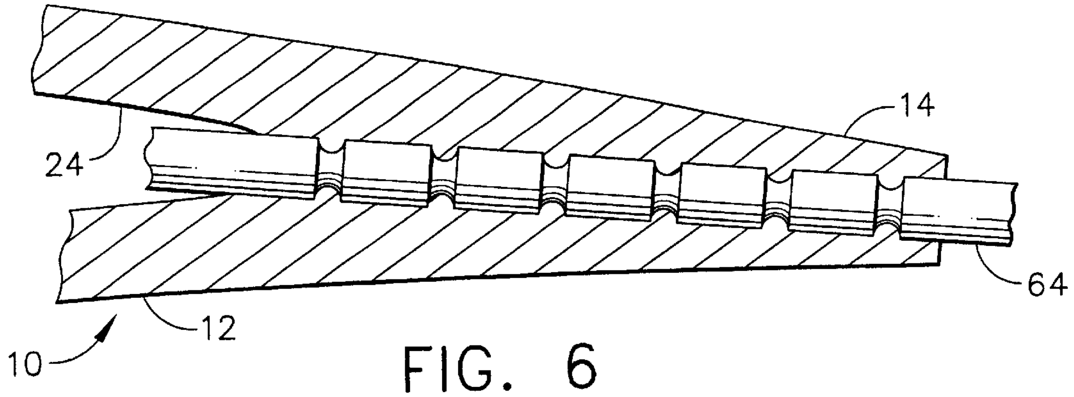
FIG. 6 is a cross section similar to FIG. 5 showing the component compressed inward toward the mandrel.

Once the mandrel 64 is in position, the body 12 is permanently deformed toward the mandrel as shown in FIG. 6 to reduce a distance 68 (FIG. 5) between the elongate annular surface 62 defining the hole 20 and the mandrel. Preferably, the component 10 is heated prior to being deformed to soften it. Although the component 10 may be heated to other temperatures without departing from the scope of the present invention, in the preferred embodiment the component is heated to a temperature below the recrystallisation temperature of the material from which the component is made. More preferably, the component is heated to a temperature about 50° F. below the recrystallisation temperature of the material. This temperature is sufficiently below the recrystallisation temperature of the material to allow for heating inaccuracy and material variations. Preferably, the distance 68 between the elongate annular surface 62 defining the hole 60 and the mandrel 64 is substantially eliminated during the step of permanently deforming the body 12 toward the mandrel, but total deformation of the component is minimized to reduce stress in the component.

After the body 12 is deformed toward the mandrel 64, the mandrel is removed from the hole 60 of the deformed component 10 to provide a turbulated hole 20 having a cross section which varies along the length 32 of the annular surface 30 defining the hole. This step may be accomplished in different ways depending upon the material from which the mandrel 64 is made. For instance, if the mandrel 64 is made of steel, it can be removed using selective acid dissolution. If the mandrel 64 is ceramic, it can be removed using a caustic leach, or if made of graphite, it can be removed by a hydrogen leach. In addition to these etching operations for removing the mandrel 64, volatilization may be used to remove the mandrel. For instance, if the mandrel 64 is made of a refractory metal such as molybdenum or tungsten, it can be oxidized away by burning. After the mandrel 64 is removed, the exterior surface 14 of the component may be machined to remove surface discontinuities.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of forming a turbulated cooling hole in a component for use in a gas turbine engine, the component including a body having an exterior surface mountable in the gas turbine engine so that the exterior surface is exposed to gases flowing through the flow path of the engine, said method comprising the steps of:

forming a hole in the body of the component, said hole being defined by an elongate annular surface extending through the body of the component and terminating at the exterior surface of the body;

positioning a mandrel in the hole formed in the component, the mandrel having a length and a cross-sectional shape which varies along the length in a predetermined manner;

permanently deforming the body toward the mandrel to reduce a distance between the elongate annular surface defining the hole and the mandrel; and removing the mandrel from the hole of the deformed component thereby to provide a turbulated hole having a cross section which varies along a length of the annular surface defining the hole.

2. A method as set forth in claim 1 further comprising the step of heating the component before permanently deforming the body toward the mandrel.

3. A method as set forth in claim 2 wherein the component is made of a material having a known recrystallisation temperature, and wherein said heating step comprises heating the component to a temperature below the recrystallisation temperature of the material before permanently deforming the body toward the mandrel.

4. A method as set forth in claim 3 wherein the temperature to which the component is heated is about 50° F. below the recrystallisation temperature of the material.

5. A method as set forth in claim 1 wherein the distance between the elongate annular surface defining the hole and the mandrel is substantially eliminated during the step of permanently deforming the body toward the mandrel.

6. A method as set forth in claim 1 wherein the mandrel is removed from the hole of the deformed component by etching.

7. A method as set forth in claim 1 wherein the mandrel is removed from the hole of the deformed component by volatilization.

* * * * *